(12) United States Patent
Tanaka et al.

(10) Patent No.: US 6,349,172 B1
(45) Date of Patent: Feb. 19, 2002

(54) LENS DRIVE DEVICE

(75) Inventors: Yoshiharu Tanaka, Kawachinagano; Junichi Tanii, Izumi, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/577,965

(22) Filed: May 25, 2000

(30) Foreign Application Priority Data

May 27, 1999 (JP) .......................................... 11-147823

(51) Int. Cl.⁷ .............................................. G03B 13/32
(52) U.S. Cl. ........................... 396/61; 396/67; 396/137; 396/159
(58) Field of Search ................................. 396/133, 137, 396/89, 61, 65, 64, 67, 70, 159

(56) References Cited

U.S. PATENT DOCUMENTS 4,149,792 A * 4/1979 Fraser et al. ................. 396/137
4,160,590 A * 7/1979 Reynard ...................... 396/137
4,724,454 A    2/1988 Misawa ....................... 396/137
4,956,657 A * 9/1990 Shintani et al. ............. 396/137

FOREIGN PATENT DOCUMENTS

JP         7-140533       6/1995    ........... G03B/17/14

* cited by examiner

Primary Examiner—W. B. Perkey
(74) Attorney, Agent, or Firm—McDermott, Will & Emery

(57) ABSTRACT

A lens drive device that is located inside a camera main body and can drive lenses that are interchangeably mounted to the camera main body, said lens drive device having a coupler that transmits the drive force to the lenses, a drive motor that rotates and drives the coupler, a clutch mechanism that connects and disconnects the coupler and the drive motor, and an encoder that detects the amount of rotation of the coupler while the coupler and the drive motor are disconnected by means of the clutch mechanism.

14 Claims, 14 Drawing Sheets

LENS DRIVE DEVICE

This application is based on application No. Hei 11-147823 filed in Japan, the content of which is hereby incorporated by reference.

1. Field of the Invention

The present invention pertains to a lens drive device capable of manual focus (MF) adjustment and auto-focus (AF) adjustment, and more particularly, to a camera equipped with interchangeable photographing lenses.

2. Description of the Related Art

In conventional AF single-lens reflex cameras, the photographing lens unit equipped with lenses is interchangeable. A photographing lens unit has a lens coupler, and the positions of the photographing lenses are changed via the rotation of the lens coupler. A lens drive motor is located inside the camera main body. The coupler on the side of the camera main body, which is connected to the lens drive motor by means of gears, protrudes from the body mount.

An encoder that detects the amount of rotation of the lens drive motor is also located inside the camera main body. When the photographing lens unit is mounted to the camera main body, a coupler engages with a lens coupler. Consequently, the drive force of the lens drive motor is transmitted to the photographing lenses, and prescribed pulse signals are generated from the encoder so that the photographing lenses will be moved to prescribed positions in an auto-focus operation.

The photographing lens unit has a focusing ring. Manual focusing is preformed by turning the focusing ring to change the positions of the photographing lenses. During manual focusing, if the photographing lenses and the lens drive motor are connected via the couplers, a load is placed on the operation of the focusing ring, which reduces operability.

Therefore, a camera has been proposed that is equipped with a mechanism that retracts the coupler from the lens coupler during manual focusing (U.S. Pat. No. 4,724,454). This mechanism disconnects the photographing lenses and the lens drive motor so that the load on the focusing ring during operation may be reduced.

However, if the connection between the lens coupler and the coupler is terminated during manual focusing, when the photographing lenses are moved by operating the focusing ring, no pulse signals are generated by the encoder. Consequently, the problem arises that the object distance is not detected because the positions of the photographing lenses are unclear, and as a result control regarding the aperture and the flash based on light measurement cannot be performed at an optimal level.

In addition, when performing auto-focusing after manual focusing, the absolute position must be detected after the photographing lenses are moved to the reference positions. Because of this necessity, there has been the problem that auto-focusing is time-consuming, resulting in poor operability.

SUMMARY OF THE INVENTION

The object of the present invention is to provide a lens drive device that makes it possible to detect the positions of the photographing lenses during manual focusing, and that improves the operability of the camera.

In order to attain this object, the present invention comprises a lens drive device that is located inside a camera main body and can drive the photographing lenses that are interchangeably mounted to the camera main body, said lens drive device having a coupler that transmits the drive force to the photographing lenses, a drive motor that rotates and drives the coupler, a clutch mechanism that connects and disconnects the coupler and the drive motor, and an encoder that detects the amount of rotation of the coupler while the coupler and the drive motor are disconnected by means of the clutch mechanism.

Using this construction, the photographing lenses are interchangeably mounted to the camera main body by means of a photographing lens unit, etc. The photographing lens unit has a lens coupler that is connected to the photographing lenses, and the photographing lens unit is connected to the camera main body, with the coupler engaging with the lens coupler. During auto-focusing in which the drive motor and the coupler are connected by means of the clutch mechanism, the drive force of the lens drive device is transmitted to the photographing lenses via the coupler and the lens coupler, such that the photographing lenses are driven. During manual focusing in which the drive motor and the coupler are disconnected by means of the clutch mechanism, the photographing lenses are moved such that the amount of rotation of the coupler may be detected by the encoder.

The encoder comprises a contact encoder that has a pulse generating pattern that rotates together with the coupler, as well as a contact that comes into contact with the pulse generating pattern and generates pulse signals. Using this construction, during manual focusing, the photographing lenses are moved such that the contact encoder having a contact can detect the amount of rotation of the coupler.

Alternatively, the encoder comprises a non-contact encoder having a pulse generating pattern that rotates together with the coupler and a non-contact detector that detects the pulse generating pattern and generates pulse signals. Using this construction, during manual focusing, the photographing lenses is moved such that the non-contact encoder having an optical or magnetic detector can detect the amount of rotation of the coupler.

The encoder comprises a contact encoder having a first pulse generating pattern that rotates together with the coupler and a contact that comes into contact with the first pulse generating pattern and generates pulse signals, as well as a non-contact encoder having a second pulse generating pattern that rotates together with the coupler and a non-contact detector that detects the second pulse generating pattern and generates pulse signals.

Using this construction, during manual focusing, the photographing lenses are moved such that the contact encoder having a contact or the non-contact encoder having a detector can detect the amount of rotation of the coupler.

In addition, the contact encoder detects the amount of rotation of the coupler when the camera has been in a standby state while waiting for the coupler to start rotating, and the non-contact encoder detects the amount of rotation of the coupler immediately after it is disconnected from the drive motor after it rotates by means of the drive motor.

Using this construction, during manual focusing after the camera has been in a standby state, the photographing lenses are moved such that the contact encoder can detect the amount of rotation of the coupler, and during manual focusing immediately after auto-focusing, the photographing lenses are moved such that the non-contact encoder can detect the amount of rotation of the coupler. The camera returns to the standby state if manual focusing is not performed for a prescribed period of time.

The amount of rotation of the coupler is detected by the non-contact encoder while the coupler and the drive motor are connected by means of the clutch mechanism. Using this construction, during auto-focusing, in which the drive motor and the coupler are connected by means of the clutch mechanism, the photographing lenses are moved such that the non-contact encoder can detect the amount of rotation of the coupler.

These and other objects, advantages and features of the invention will become apparent from the following description thereof taken in conjunction with the accompanying drawings which illustrate specific embodiment of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
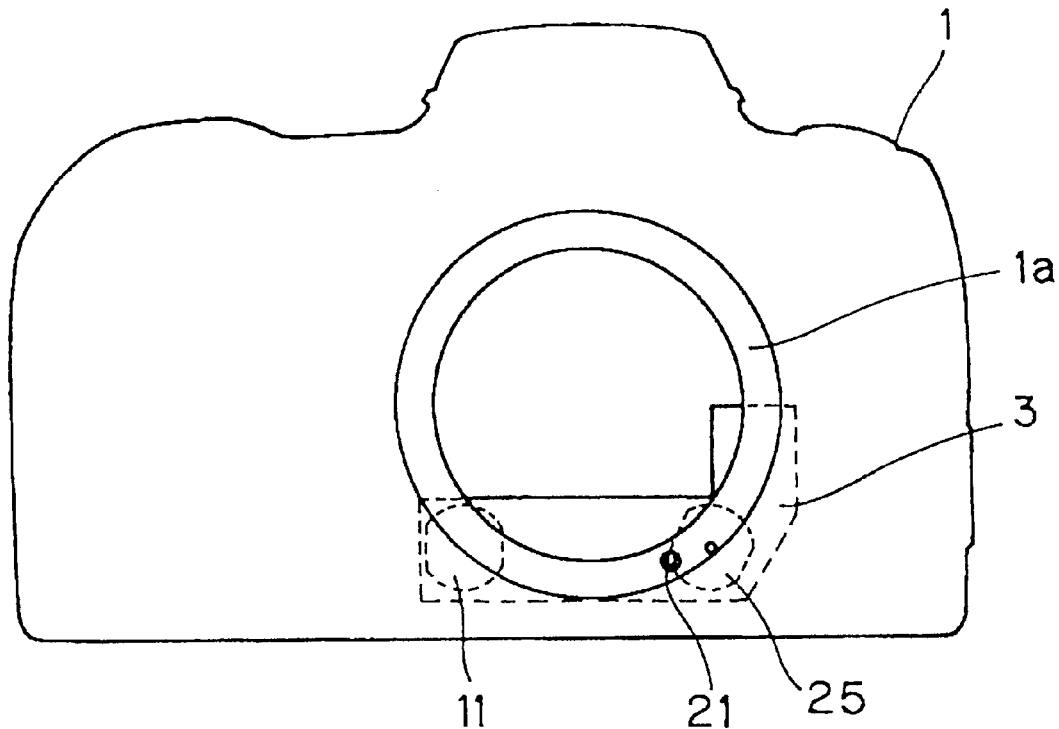
FIG. 1 is a front elevation of the camera main body to which the lens drive device comprising a first embodiment of the preset invention is mounted.
Figure 2:
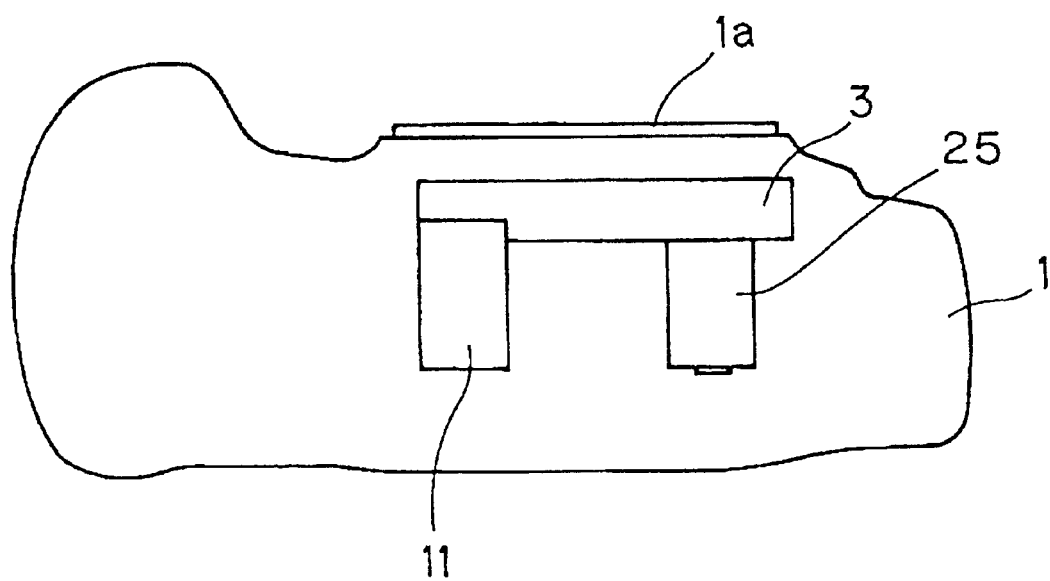
FIG. 2 is a bottom view of the camera main body to which the lens drive device comprising the first embodiment is mounted.

FIGS. 1 and 2 are a front elevation and a bottom view showing the camera main body to which the lens drive device comprising a first embodiment of the present invention is mounted. A body mount 1a by which to mount a photographing lens unit 50 is located on the front surface of the camera main body 1. The lens drive device 3 is mounted inside the camera main body 1 so that the drive force of the lens drive motor 11 may be transmitted to the photographing lens unit via the coupler 21.

Figure 3:
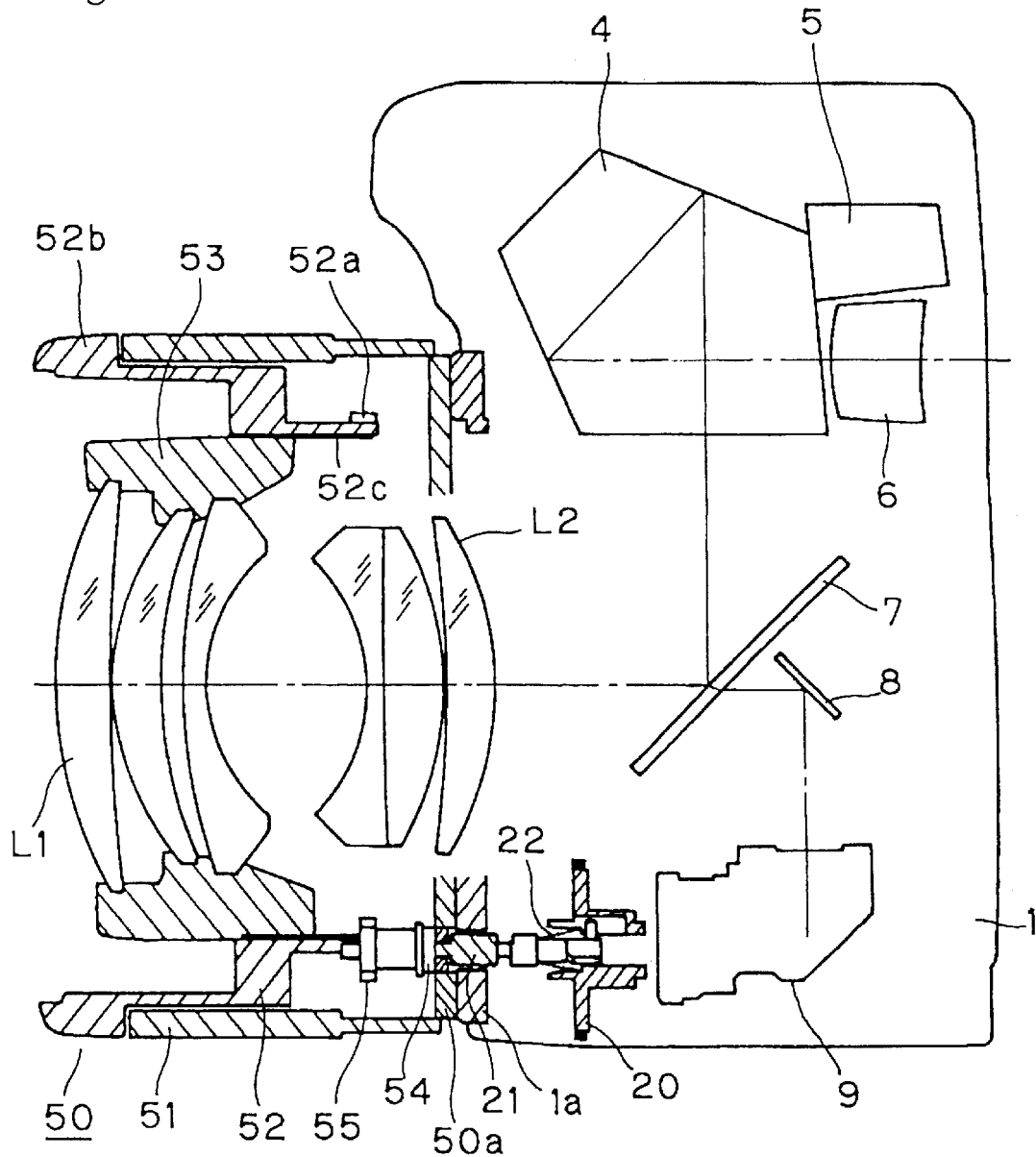
FIG. 3 is a side cross-section in which the lens drive device comprising the first embodiment is mounted.

FIG. 3 is a side cross-section of the camera main body 1 on which a photographing lens unit 50 is mounted. The photographing lens unit 50 is mounted such that the lens mount 50a is in close contact with the body mount 1a. Inside the photographing lens unit 50 are located a first lens unit L1 and second lens unit L2. The lenses of the first lens unit L1 are supported in a lens holder 53. The lenses of the second lens unit L2 are also supported in a lens holder (not shown in the drawing).

The light from the photo object that strikes the first lens unit L1 passes through the second lens unit L2. Some of the light then passes through the main mirror 7, while the rest of the light is reflected by the mirror 7. The light reflected by the main mirror 7 is led to the finder 6 by the pentagonal roof prism 4. A photometric unit 5 is located above the finder 6 to detect the brightness. The light that passes through the main mirror 7 is reflected by the sub-mirror 8, and strikes the AF sensor 9 that detects the focus status of the photo object.

The outer circumference of the photographing lens unit 50 comprises an outer sheath 51. A focusing ring 52 is rotatably supported inside the outer sheath 51. The focusing ring 52 has an operating member 52b, which can be operated manually by the user. The focusing ring 52 also has a gear 52a, which engages with the coupler gear 55 that is integrally mounted with the lens coupler 54.

The lens coupler 54 is engaged with the coupler 21 such that when the coupler 21 rotates, the focusing ring 52 rotates via the lens coupler 54 and the lens coupler gear 55. The rotation of the focusing ring 52 moves the lens holder 53 forward or backward via the drive converter 52c, whereupon focusing is performed.

Figure 4:
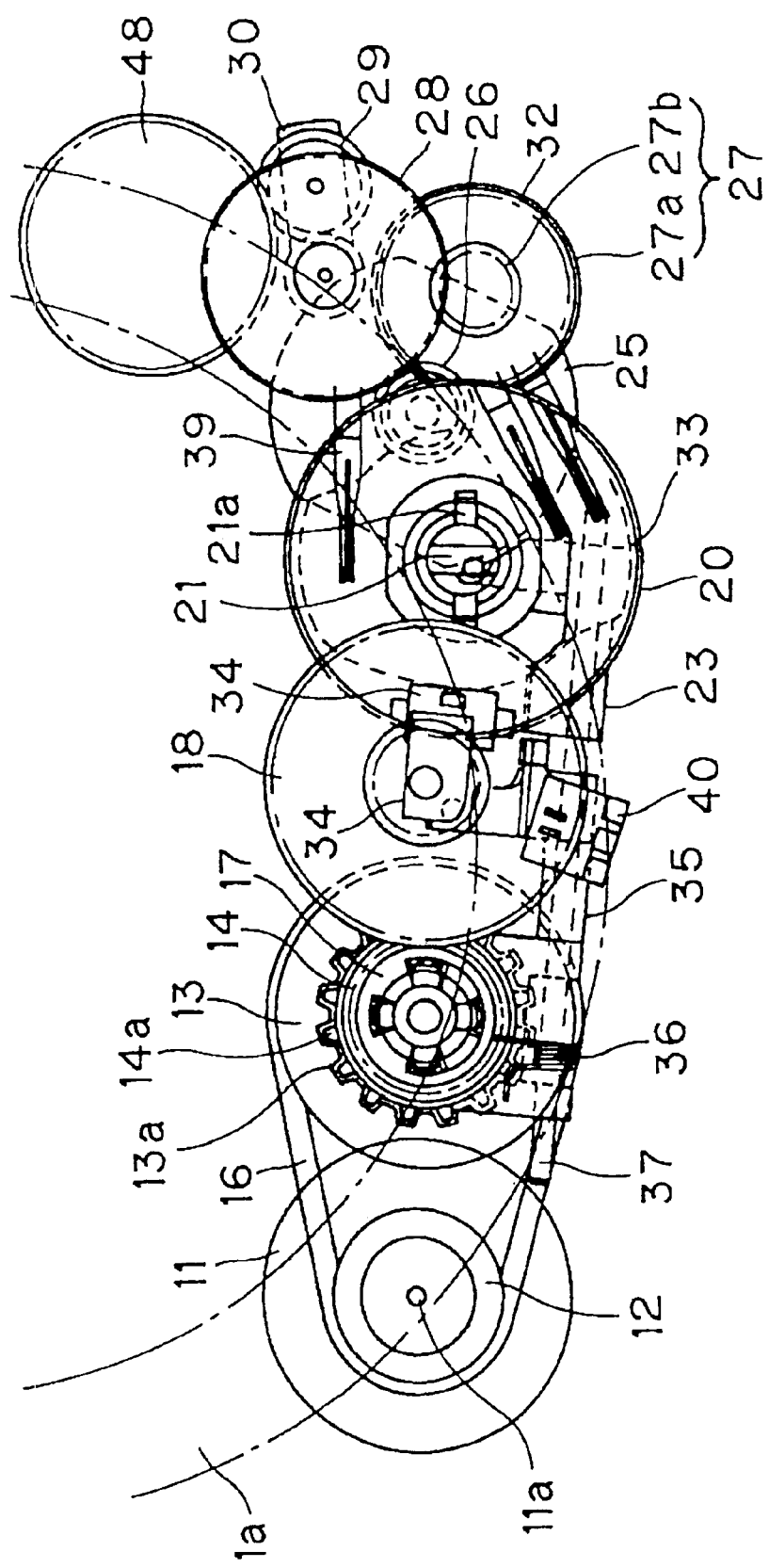
FIG. 4 is a front elevation of the lens drive device comprising the first embodiment.
Figure 5:
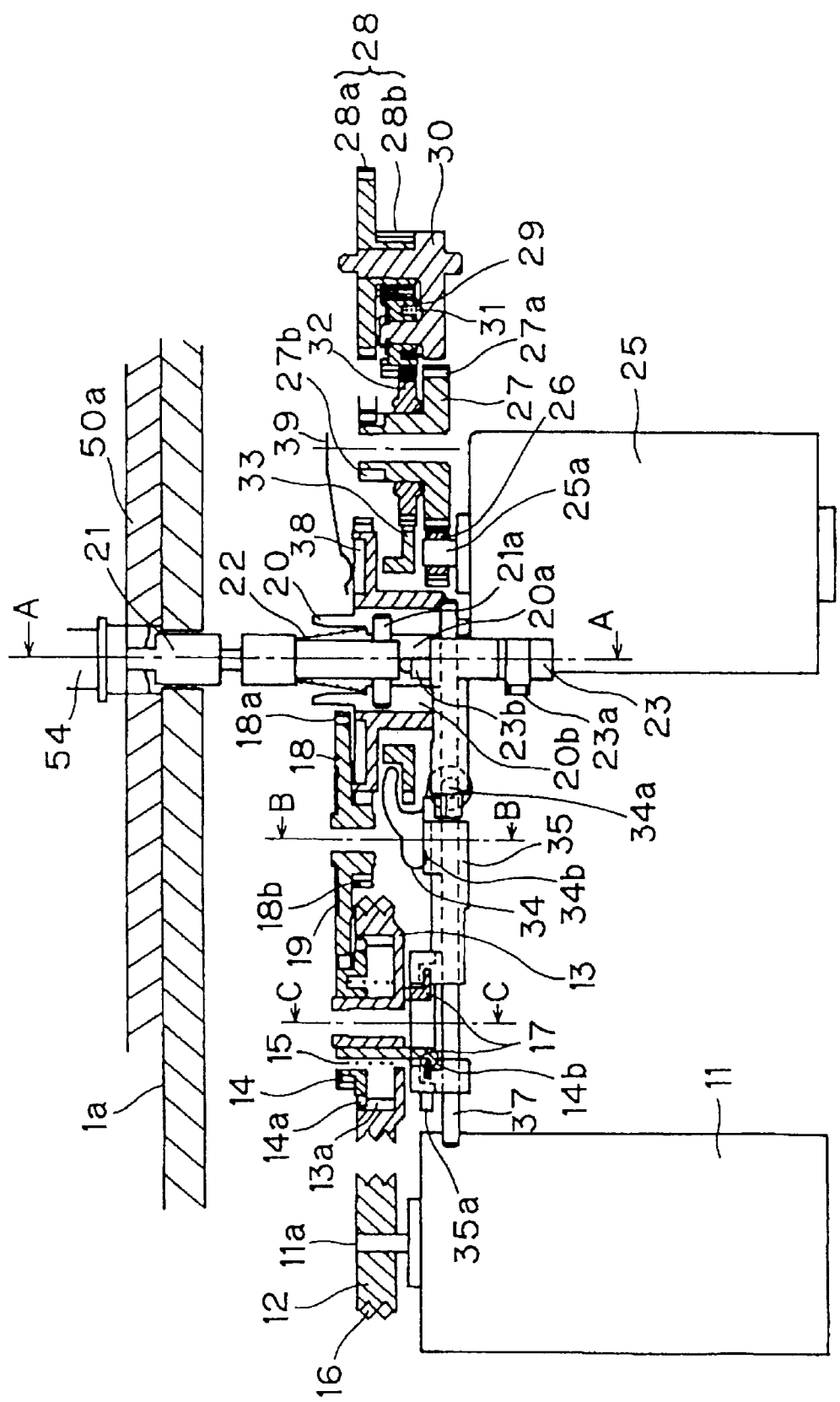
FIG. 5 is a bottom view of the lens drive device comprising the first embodiment.

FIGS. 4 and 5 are a front elevation and a bottom view of the lens drive device 3, and show its components in detail. A motor pulley 12 is fixed to the motor shaft 11a of the lens drive motor 11. The reduction pulley 13 supported by means of a shaft to the base plate (not shown in the drawings) of the lens drive device 3 is connected to the motor pulley 12 by means of a belt 16.

The clutch gear 14 is mounted on the same shaft as the reduction pulley 13, such that the grooves 13a of the reduction pulley 13 that extend along the shaft and the protrusions 14a of the clutch gear 14 engage with each other and the clutch gear 14 and the reduction pulley 13 rotate together. The clutch gear 14 can also move along the shaft.

The clutch gear 14 is pushed in the direction of the body mount 1a (upward in FIG. 5) by the clutch gear force spring 15. Because the clutch plate 17 located between the clutch gear 14 and the reduction pulley 13 engages with the claws 14b of the clutch gear 14, the clutch plate 17 is grasped such that the position of the clutch gear 14 is regulated.

Figure 6:
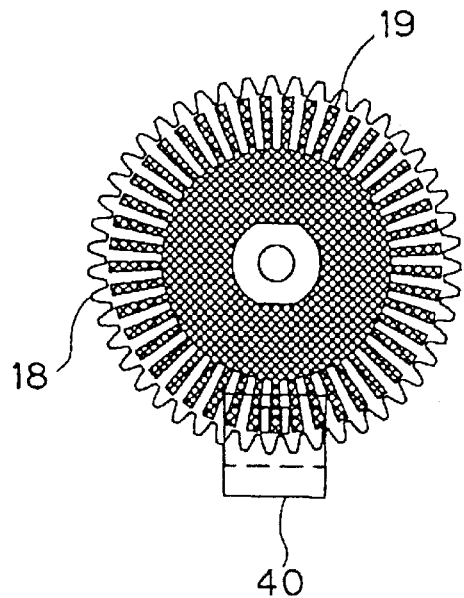
FIG. 6 is a drawing showing the non-contact pulse generating pattern in the lens drive device comprising the first embodiment.

The clutch gear 14 is engaged with the large gear 18a of the reduction gears 18, which comprise two-tier gears. The small gear 18b of the reduction gears 18 is engaged with the coupler gear 20. The reduction gears 18 and the coupler gear 20 are mounted to the base plate by means of shafts. A pulse generating pattern 19 as shown in FIG. 6 is formed on the front surface of the reduction gear 18a.

Figure 7:
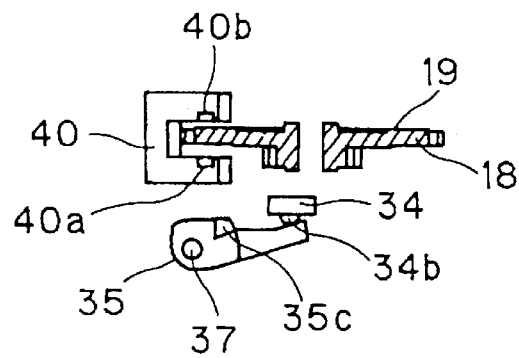
FIG. 7 is a cross-section of the lens drive device cut along the B—B line in FIG. 5.

In FIG. 7, a B—B cross section of FIG. 5, a photointerrupter 40 (detector) is located such that it faces the reduction gear 18a from the top as well as from the bottom. The photointerrupter 40 has one light emitting unit 40a and two light receiving units 40b, such that the light emitted from the light emitting unit 40a is received by the two light receiving units 40b so that the received light has different phases.

The pulse generating pattern 19 and the photointerrupter 40 comprise a non-contact encoder that detects the direction and amount of rotation of the reduction gears 18. Besides the optical method using a photointerrupter 40, the magnetic method using an MR element may be used for the non-contact encoder.

Figure 8:
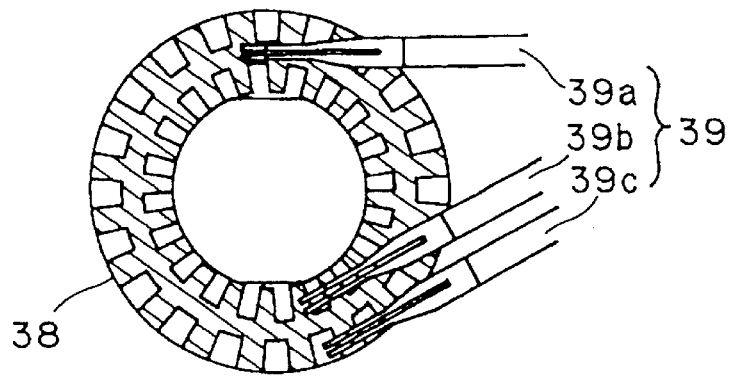
FIG. 8 is a drawing showing the contact pulse generating pattern in the lens drive device comprising the first embodiment.

A substrate 38 having a pulse generating pattern 38a as shown in FIG. 8 is fixed to the front surface of the coupler gear 20. Three contacts 39 come into contact with the pulse generating pattern 38a, such that signals are generated based on short-circuiting between the signal contacts 39b or 39c and the grounding contact 39a and the amount of rotation is detected.

The pulse generating pattern 38a has different phases in the inner area where the signal contact 39b makes contact and the outer area where the signal contact 39c makes contact. The direction of rotation of the coupler gear 20 may be detected depending on whether the signal contact 39b or 39c is short-circuited with the grounding contact 39a. These contacts 39a, 39b and 39c and the pulse generating pattern 38a comprise a contact encoder that detects the direction and amount of rotation of the coupler gear 20.

The contact encoder consumes little power, but it receives a significant load due to the frictional resistance of contact. In addition, if the number of pulses is increased, it is possible that an incorrect direction of rotation may be detected due to an error in the relative positions of the two signal contacts 39b and 39c, and therefore the resolution cannot be increased. Although the resolution could be increased by forming more pulses on a gear faster than the coupler gear 20, the load applied by the contacts 39 would increase.

In contrast, no load is generated with the non-contact encoder because there is no contact, although it consumes much more power. Therefore, the resolution may be increased by forming more pulses on a gear faster than the coupler gear 20.

Therefore, in this embodiment, a contact encoder is formed using the coupler gear 20, and a non-contact encoder that is faster than the coupler 20 is formed using the reduction gears 18. Consequently, the accuracy in auto-focusing is increased by using the non-contact encoder during auto-focusing.

During manual focusing, positioning of the photographing lenses is performed manually, and the lens position should be detected only for the purpose of light measurement. Therefore, the contact encoder is used to reduce power consumption. The lens position is detected from the detected direction and amount of rotation of the coupler 21 to perform control of the aperture and the flash. Where a sufficient resolution may be obtained using a contact encoder, the non-contact encoder may be eliminated. In that case, the cost may be reduced.

The contact encoder is used during manual focusing that follows after power to the camera has been turned ON and the camera has been in a standby state while waiting for focusing to be performed. Because the non-contact encoder is already working during auto-focusing, the non-contact encoder may be used during the manual focusing that immediately follows auto-focusing. In this case, the setting should be made such that the camera returns to the standby state if the focusing ring 50 is not operated for a prescribed period of time. In this way, it is not necessary to continue to supply power to the photointerrupter 40 when the camera is in the standby state, which reduces power consumption.

The coupler gear 20 has a pierced hole 20a, which has two grooves 20b on its outer circumference that extend along the direction of the coupler gear shaft. The coupler 21 engages with the pierced hole 20a, and because the protrusions 21a on the coupler 21 engage with the grooves 20b, the coupler 21 rotates together with the coupler gear 20 as if they were one unit. The coupler 21 may move along the shaft with the protrusions 21a guided in the grooves 20b.

Figure 9:
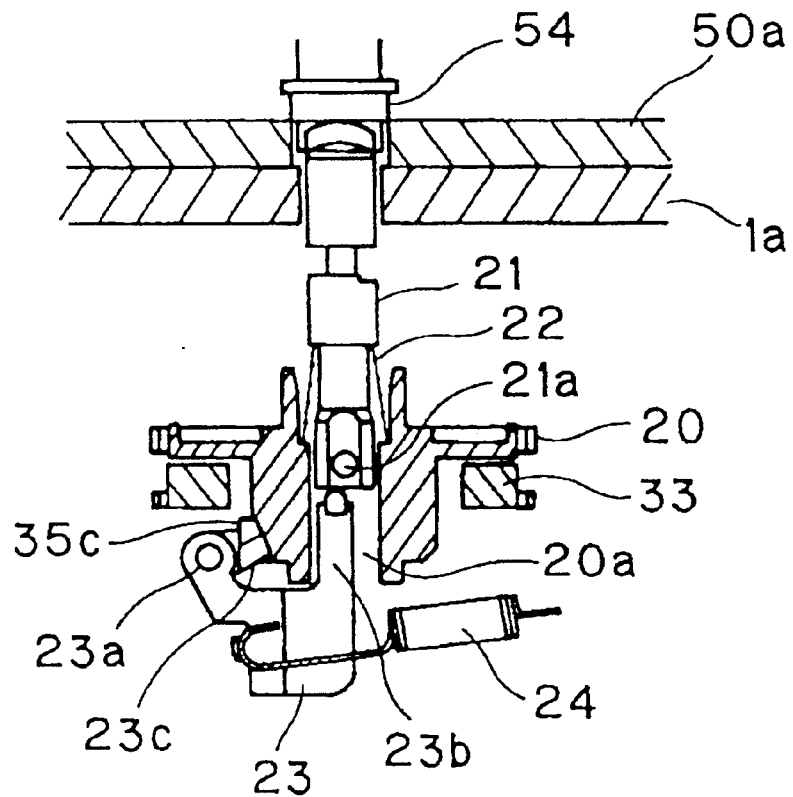
FIG. 9 is a cross-section of the lens drive device cut along the A—A line in FIG. 5.

In FIG. 9, an A—A cross section of FIG. 5, the coupler push lever 23 that is supported by means of a shaft 23a to the base plate (not shown in the drawing) has its push member 23b inserted in the pierced hole 20a of the coupler gear 20. The push member 23b is in contact with the coupler 21, which is forced toward the body mount 1a by a coupler pull spring 24. The coupler 21 is also forced toward the body mount 1a by a coupler force spring 22 that is located between the coupler 21 and the coupler gear 20.

Using this construction, the drive force of the lens drive motor 11 is transmitted to the coupler 21 via the motor pulley 12, belt 16, reduction pulley 13, clutch gear 14, reduction gears 18 and coupler gear 20, and rotates the lens coupler 54.

When the transmission occurs, due to the large force exerted by means of the coupler pull spring 24 and the coupler force spring 22, the coupler 21 is pushed against the lens coupler 54. Therefore, even if the load torque due to the moving friction and reduction ratio during the driving of the focusing ring 52 in auto-focusing is large, the coupler 21 does not retract, such that the lens coupler 54 may be reliably rotated.

The operation of the clutch mechanism will now be explained. In FIGS. 4 and 5, the motor shaft 25a of the alternating motor 25 has an integral motor gear 26. The motor gear 26 is engaged with the large gear 27a of the two-tier reduction gears 27. The reduction gears 27 are supported by means of a shaft to the base plate, and the small gear 27b of the reduction gears 27 is engaged with the large gear 28a of the two-tier solar gears 28.

The solar gears 28 are rotatably supported by a satellite carrier 30 that is supported by means of a shaft to the base plate, and the small gear 28b of the solar gears 28 is engaged with the satellite gear 29 supported to the satellite carrier 30. The satellite gear 29 is frictionally connected to the satellite carrier 30 by means of a friction spring 31.

Therefore, when the solar gears 28 rotate counterclockwise in FIG. 4, the satellite carrier 30 moves in the counterclockwise direction such that the satellite gear 31 engages with the charge gear 48. The charge gear 48 is used to charge the main mirror 7 (see FIG. 3) during exposure.

Because the clutch mechanism is not driven during exposure, by using the alternating motor 25 to drive the clutch mechanism to charge the main mirror 7, the camera may be made compact and the cost may be reduced. The charge gear 48 may also be used for other purposes.

When the solar gears 28 rotate clockwise in FIG. 4, the satellite carrier 30 moves clockwise such that the satellite gear 31 engages with the idle gear 32. The idle gear 32 is rotatably located on the same shaft as the reduction gears 27, and is engaged with the cam gear 33.

Figure 10:
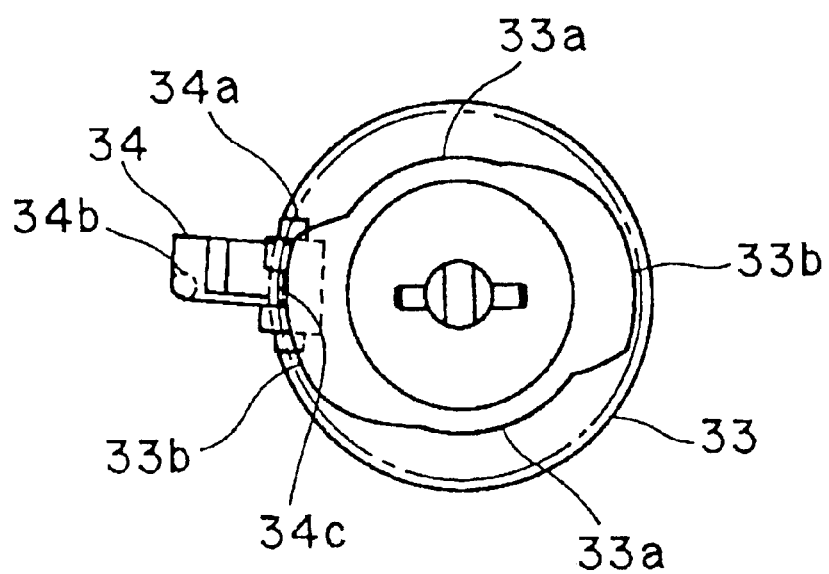
FIG. 10 is a drawing showing the cam gear of the lens drive device comprising the first embodiment.
Figure 11:
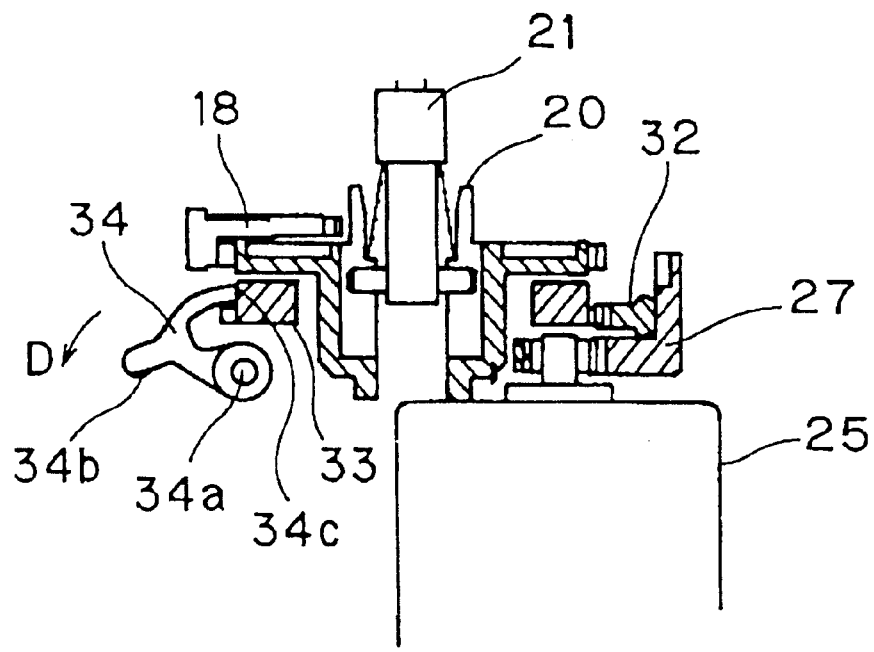
FIG. 11 is a drawing to explain the operation of the lever member of the lens drive device comprising the first embodiment.

The cam gear 33 is rotatably located on the same shaft as the coupler gear 20 and, as shown in FIG. 10, has a first cam surface 33a and a second cam surface 33b. As shown in FIG. 10, depending on the rotational position of the cam gear 33, the second cam surface 33b comes into contact with the contact member 34c of the lever member 34 that is supported by means of a shaft 34a, such that the cam gear 33 rotates the lever member 34 as shown by the arrow D in FIG. 11.

Figure 12:
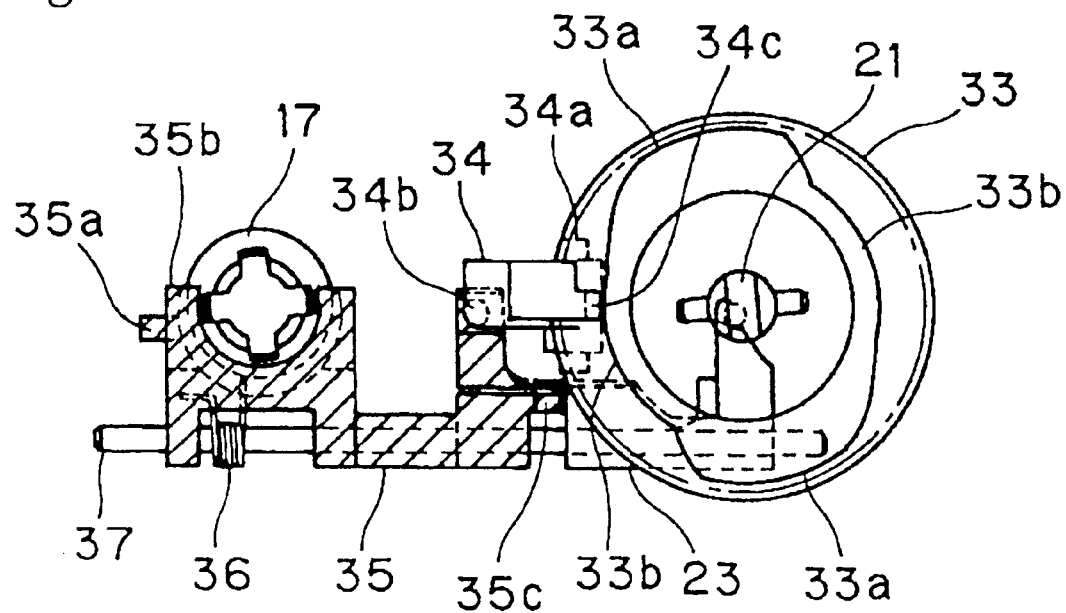
FIG. 12 is a drawing showing the clutch lever of the lens drive device comprising the first embodiment.
Figure 13:
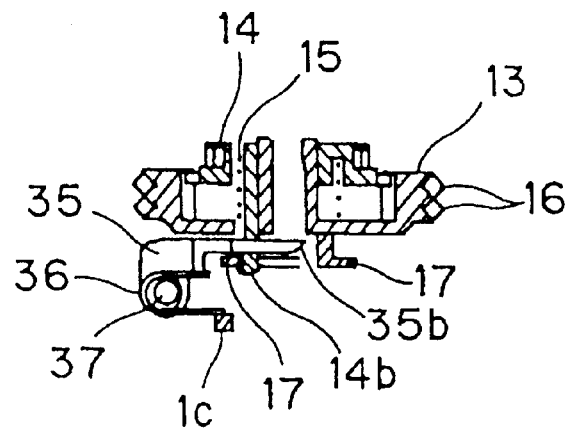
FIG. 13 is a cross-section of the lens drive device cut along the C—C line in FIG. 5.

The lever member 34 has a protrusion 34b. As shown in FIG. 7 referred to above, the protrusion 34b is in contact with the clutch lever 35 that is integrally mounted to the shaft 37 rotatably supported to the base plate. FIG. 12 shows the details of the clutch lever 35 area shown in FIG. 4, and FIG. 13 is a C—C cross section of FIG. 5. The shaded area comprises the clutch lever 35 in FIG. 12.

With reference to these drawings, the clutch lever 35 is pushed toward the body mount 1a (see FIG. 5) by a clutch lever force spring 36. The position of the clutch lever force spring 36 is regulated by a rib 1c mounted on the base plate. The position of the clutch lever 35 is regulated by its protrusion 35a being in contact with the base plate. In this state, the lever 35b of the clutch lever 35 is located between the reduction pulley 13 and the clutch plate 17.

Figure 14:
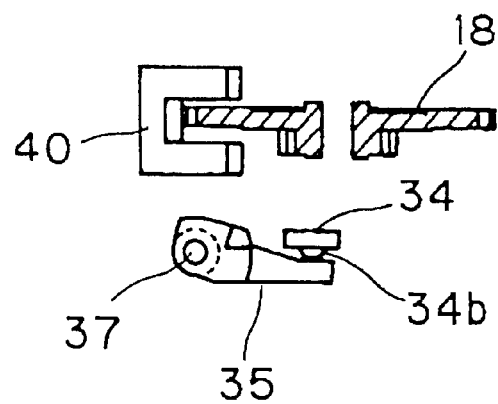
FIG. 14 is a drawing to explain the operation of the clutch lever of the lens drive device comprising the first embodiment.
Figure 15:
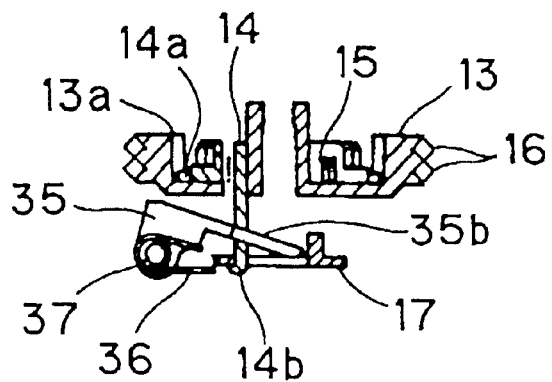
FIG. 15 is a drawing to explain the operation of the clutch lever of the lens drive device comprising the first embodiment.

As described above, when the lever member 34 comes into contact with the second cam surface 33b of the cam gear 33, the lever member 34 moves. When this occurs, the protrusion 34b of the lever member 34 pushes the clutch lever 35 as shown in FIG. 14. Consequently, as shown in FIG. 15, the lever member 35b of the clutch lever 35 pushes down the clutch plate 17 against the force from the clutch gear force spring 15. As a result, the clutch gear 14 moves in the direction opposite from the body mount 1a (see FIG. 5), whereupon it disengages from the reduction gears 18.

Therefore, a clutch mechanism is constructed in which the clutch gear 14 and the reduction gears 18 are disengaged by means of the clutch lever 35 and the clutch plate 17 when the cam gear 33 reaches the position at which the second cam surface 33b comes into contact with the contact member 34c of the lever member 34 through the drive from the alternating motor 25 and via the motor gear 26, reduction gears 27, solar gears 28, satellite gear 29 and idle gear 32.

When the cam gear 33 comes to the position where the first cam surface 33b and the contact member 34c of the lever member 34 face each other due to the drive from the alternating motor 25, the clutch gear 14 returns to the position shown in FIG. 5 due to the force from the clutch gear force spring 15, whereupon it engages with the reduction gears 18. When this occurs, the lever member 34 returns to the position shown in FIG. 5 due to the force from the clutch lever force spring 36.

As described above, when the clutch gear 14 and the reduction gears 18 are engaged with each other by means of the clutch mechanism, the drive force of the lens drive motor 11 is transmitted to the coupler gear 20 in order to perform auto-focusing. In addition, by disengaging the clutch gear 14 from the reduction gears 18 by means of the clutch mechanism during manual focusing, the connection between the focusing ring 52 (see FIG. 3) and the lens drive motor 11 is terminated such that the load on the focusing ring 52 during its operation may be reduced.

During manual focusing, because the contact encoder is located at a position at which it moves together with the coupler 21, it detects the position of the first lens unit L1 based on the pulse signals generated from the contacts 39 so that the object distance may be detected. Therefore, control regarding the aperture and the flash may be performed in the best way based on the brightness detected by the photometric unit 5.

When the mode is alternated from manual focusing to auto-focusing, it is not necessary to move the photographing lenses to the reference position to detect their absolute position, and consequently auto-focusing may be quickly performed and the operability of the camera may be improved.

As shown in FIG. 12 referred to above, the clutch lever 35 has an engaging member 35c. The engaging member 35c is located at a position at which it faces the protrusion 23c on the coupler push lever 23, as shown in FIG. 9 referred to above.

Figure 16:
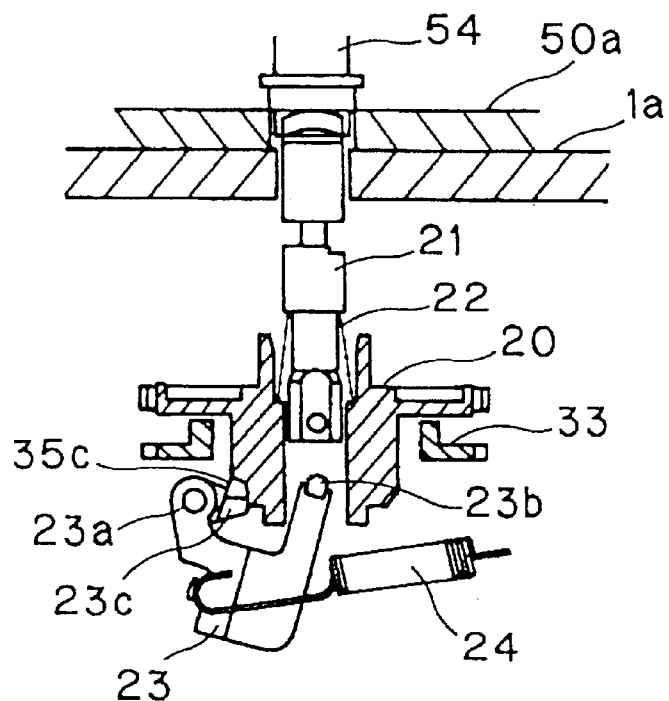
FIG. 16 is a drawing to explain the operation of the coupler push lever of the lens drive device comprising the first embodiment.

When the lever member 34 comes into contact with the second cam surface 33b of the cam gear 33, the engaging member 35c of the clutch lever 35 comes into contact with the protrusion 23c of the coupler push lever 23 as the clutch lever 35 moves, and pushes down the coupler push lever 23 against the force from the coupler pull spring 24, as shown in FIG. 16.

Consequently, during manual focusing the coupler 21 is pressed against the lens coupler 54 only by means of the force from the coupler force spring 22. Therefore, the load on the focusing ring 52 is further reduced during manual operation.

Figure 17:
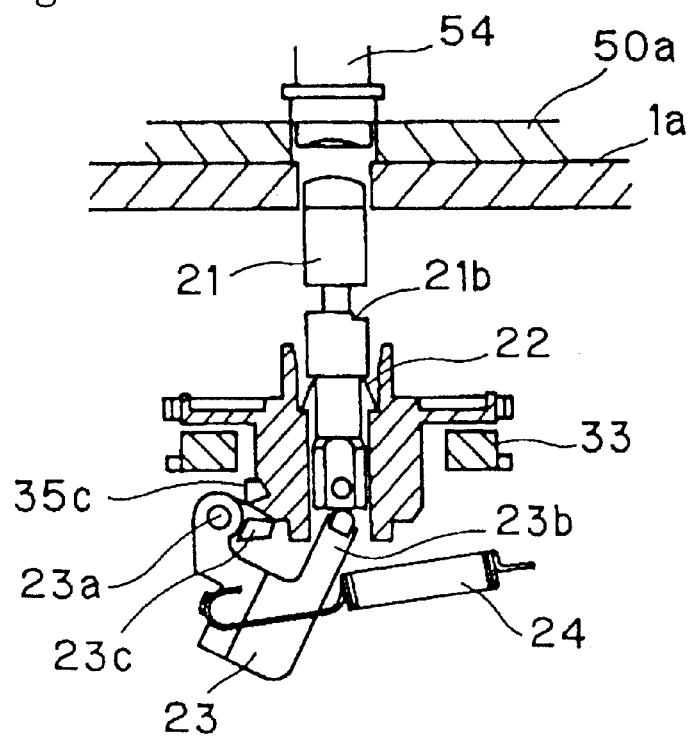
FIG. 17 is a drawing to explain the operation to remove the photographing lens unit from the lens drive device comprising the first embodiment.

As shown in FIG. 17, when the concave member 21b of the coupler 21 is pushed down by means of a removing lever not shown in the drawing against the force from the coupler force spring 22 and the coupler pull spring 24, the coupler 21 may be disconnected from the lens coupler 54. As a result, the photographing lens unit 50 may be removed from the camera main body 1.

Figure 18:
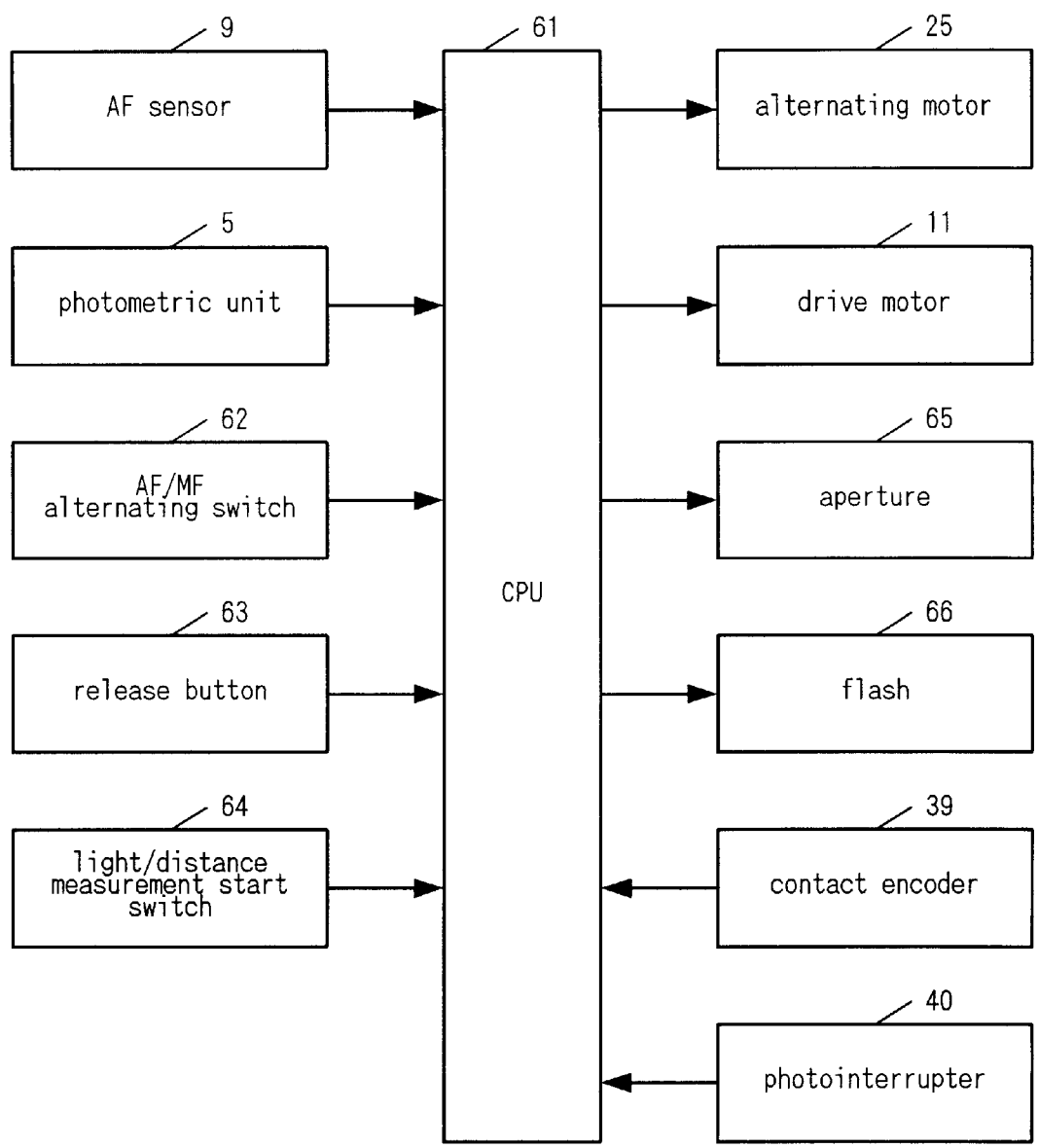
FIG. 18 is a block diagram of the camera in which the lens drive device comprising the first embodiment is mounted.
Figure 19:
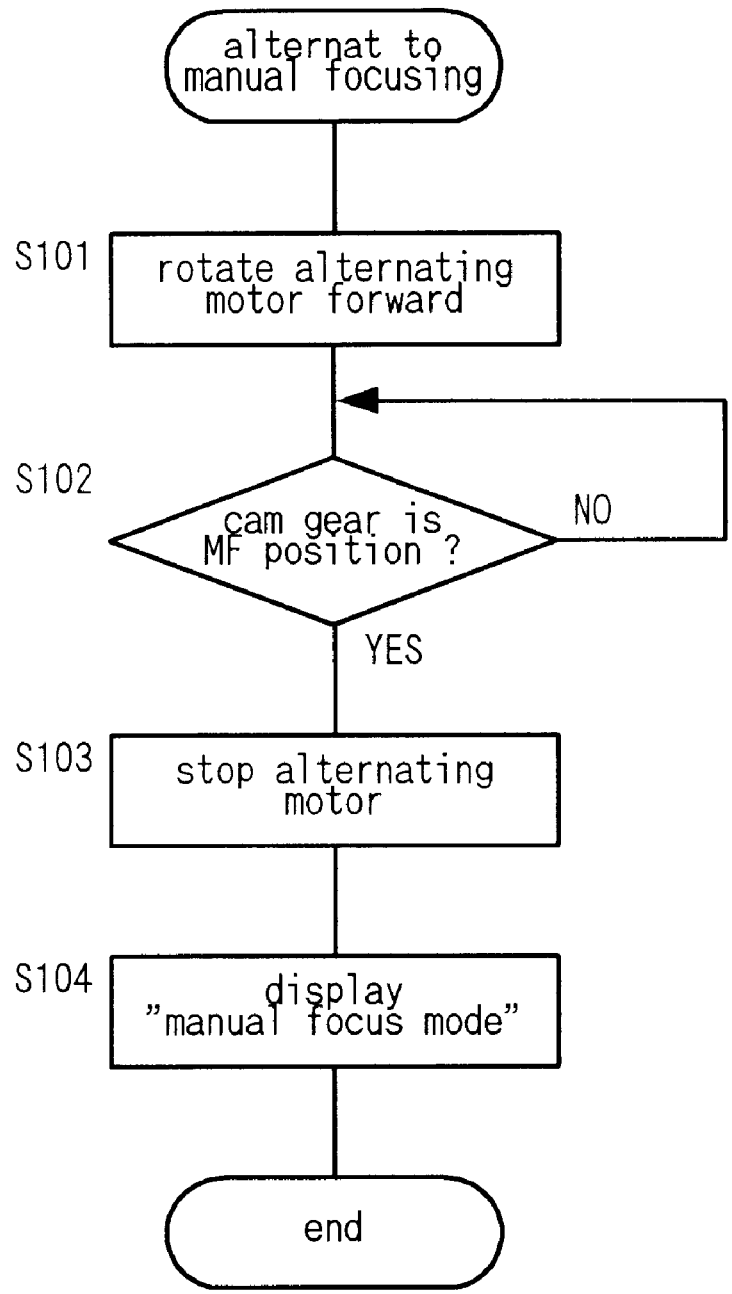
FIG. 19 is a flow chart showing the sequence by which to switch to manual focusing in the lens drive device comprising the first embodiment.

FIG. 18 shows a block diagram of the camera main body to which the lens drive device comprising this embodiment is mounted. The CPU 61 detects input from the AF/MF alternating switch 62 that alternates between auto-focusing and manual focusing. When the AF/MF alternating switch 62 is set to manual focusing, the sequence by which to switch to manual focusing shown in the flow chart of FIG. 19 is performed.

In step S101, the CPU 61 drives the alternating motor 25 to rotate forward such that the solar gears 28 rotate clockwise in FIG. 4. The CPU 61 determines whether or not the rotational position of the cam gear 33 is at the MF position in step S102. Here, the MF position is the position at which the second cam surface 33b comes into contact with the contact member 34c of the lever member 34.

When the cam gear 33 rotates to the MF position, the lens drive motor 11 is disconnected from the focusing ring 52, whereupon the drive of the alternating motor 25 is stopped (step S103). In step S104, the fact that the camera is in manual focus mode is displayed in the display area in the camera main body 1, whereupon the camera enters the standby state.

When it detects input from the light/distance measurement start switch 64, the CPU 61 detects the amount of light by means of the photometric unit 5. It then detects the object distance by detecting the lens position by means of the contacts 39 (contact encoder). The CPU 61 then controls the aperture 65 and the flash 66. When the CPU 61 detects input from the release button 63, exposure is performed.

The manual focus switching sequence shown in the flow chart of FIG. 19 may be called not only when the mode is alternated by means of the AF/MF alternating switch 62, but also when the light/distance measurement start switch 64 is turned ON or when the photo object has come into focus through auto-focusing.

Figure 20:
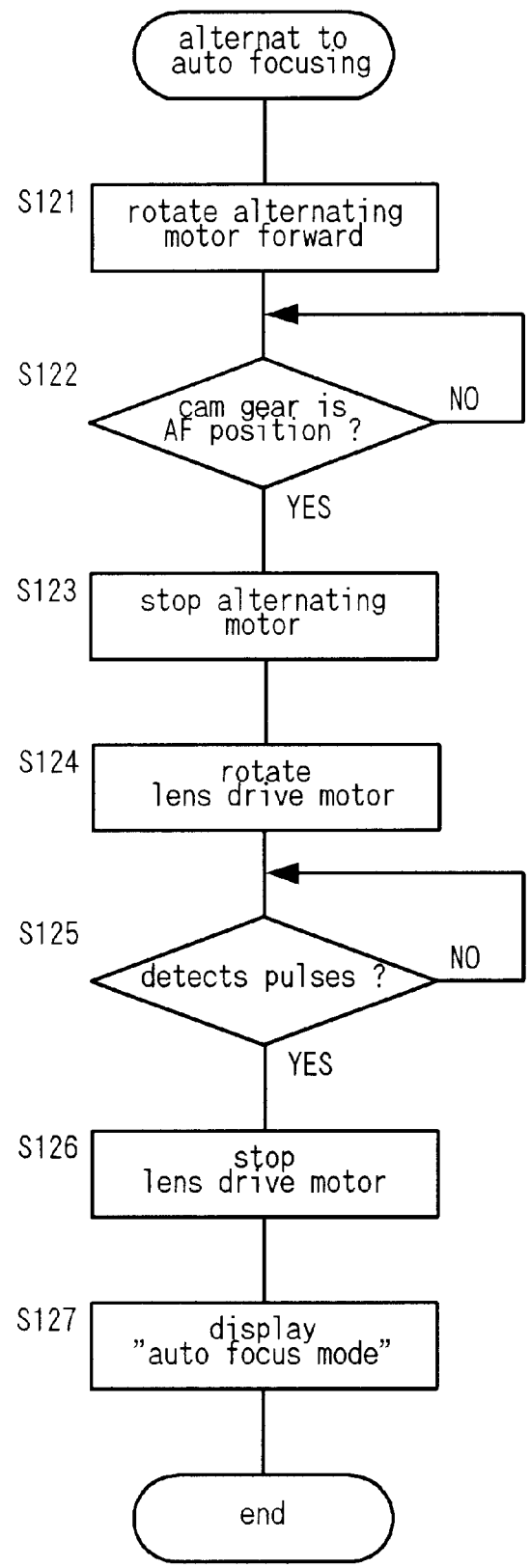
FIG. 20 is a flow chart showing the sequence by which to switch to auto-focusing in the lens drive device comprising the first embodiment.

When the AF/MF alternating switch 62 is turned to auto-focusing, the sequence by which to switch to auto-focusing shown in the flow chart of FIG. 20 is performed through control by the CPU 61. In step S121, the CPU 61 drives the alternating motor 25 to rotate forward. In step S122, it determines whether or not the cam gear 33 has rotated to the AF position. Here, the AF position is the position at which the first cam surface 33b faces the contact member 34c of the lever member 34.

When the cam gear 33 rotates to the AF position, the clutch gear 14 moves in the direction in which it engages with the reduction gears 18, and the drive of the alternating motor 25 is stopped (step S123). In step S124, the lens drive motor 11 is driven in order to properly engage the clutch gear 14 with the reduction gears 18 if their phases do not match.

When it detects the pulses generated by the photointerrupter 40 in step S125, the CPU 61 determines that the clutch gear 14 and the reduction gears 18 have engaged and the lens drive motor 11 is stopped in step S126. In step S127, the fact that the camera is in auto-focus mode is displayed in the display area, whereupon the camera enters the standby state.

The CPU 61 then detects the focus state of the photo object by means of the AF sensor 9. Depending on the detection result, the CPU 61 drives the lens drive motor 11 to perform auto-focusing and positions the first lens unit L1 at the prescribed position by means of the photointerrupter 40 (non-contact encoder). The sequence from step S124 through step S126 may be performed when auto-focusing is performed. Furthermore, the amount of light is detected by means of the photometric unit 5, and the aperture 65 and the flash 66 are controlled accordingly. When the CPU 61 detects input from the release button 63, exposure is performed.

The sequence by which to switch to auto-focusing shown in the flow chart of FIG. 20 may be called not only when the mode is alternated by means of the AF/MF alternating switch 62, but also when the light/distance measurement start switch 64 is turned OFF or when focusing was manually performed and exposure has taken place, for example.

Figure 21:
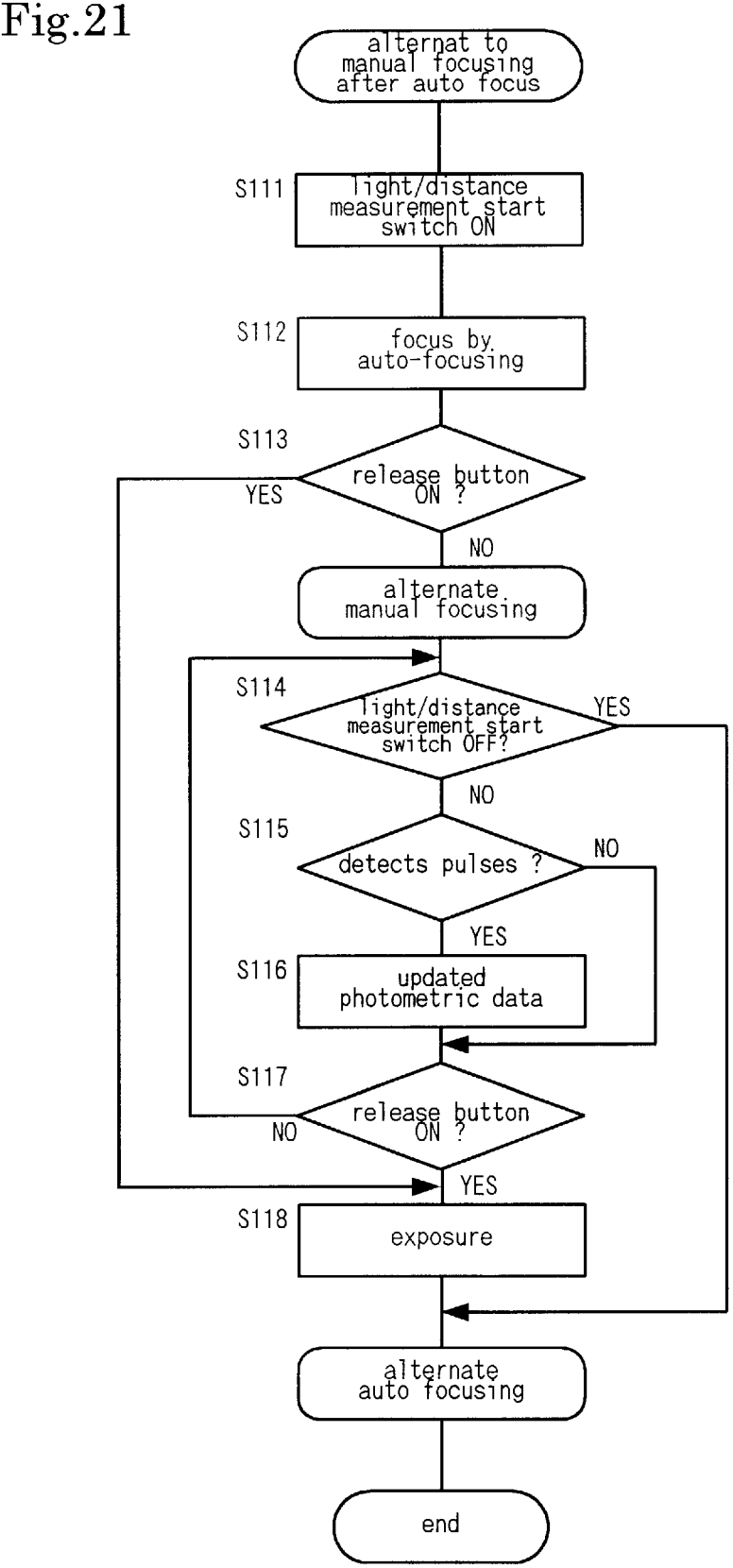
FIG. 21 is a flow chart showing the sequence by which to switch to auto-focusing after performing exposure using manual focusing in the lens drive device comprising the first embodiment.

FIG. 21 shows a flow chart of the sequence by which to switch to manual focusing after focusing is performed through auto-focusing. The light/distance measurement start switch 64 is turned ON in step S111 and auto-focusing takes place in step S112. When the photo object is in focus, the CPU 61 determines whether or not the release button 63 has been pressed in step S113.

When the release button 63 is pressed, the CPU 61 progresses to step S118 in which exposure is performed. Where the focusing ring 52 is manually turned without the release button 63 having been pressed, the sequence by which to switch to manual focusing shown in the flow chart of FIG. 19 is called. It is then determined in step S114 whether or not the light/distance measurement start switch 64 has been turned OFF. Where it is OFF, the sequence by which to switch to auto-focusing shown in the flow chart of FIG. 20 takes place.

In step S115, when the CPU 61 detects pulses generated by the contacts 39 (contact encoder) through manual focusing, the photometric data is updated in step S116 based on the detection result. The aperture 65 and the flash 66 are controlled based on this photometric data.

The sequence from step S114 through step S116 is repeatedly performed until the CPU 61 detects in step S117 that the release button 63 has been pressed. When the release button 63 is pressed, exposure takes place in step S118 and the sequence by which to switch to auto-focusing shown in the flow chart of FIG. 20 is performed.

An explanation was provided regarding the first embodiment with reference to a camera that uses an interchangeable photographing lens unit, but where the lens unit is integrally mounted to the camera main body, the lens coupler 54 and the coupler 21 may be constructed as one unit, and the construction in which the coupler 21 may move along the shaft may be eliminated.

In this case, the amount of movement of the lenses may also be detected during manual focusing by locating the encoder on the lens side relative to the clutch.

Figure 22:
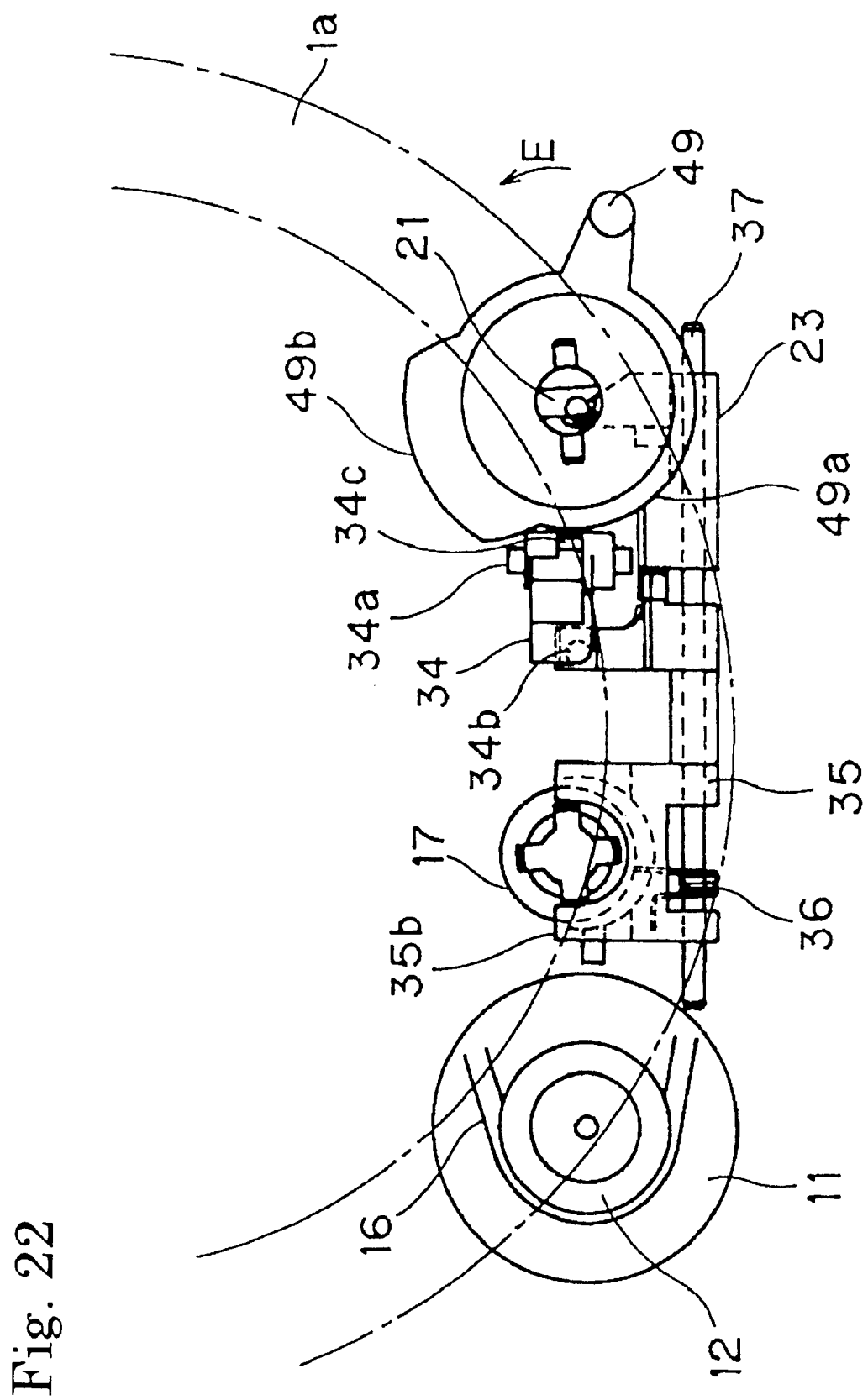
FIG. 22 is a front elevation of the lens drive device comprising a second embodiment of the present invention.

FIG. 22 is a basic plan view showing the lens drive device comprising a second embodiment. The same numbers are used for the same components in the first embodiment. In this embodiment, the switching between auto-focusing and manual focusing is performed by means of an AF/MF alternating lever 49, and the alternating motor 25, motor gear 26, reduction gears 27, solar gears 28, satellite gear 29, satellite carrier 30, idle gear 32 and cam gear 33 used in the first embodiment are eliminated. The rest of the construction is the same as in the first embodiment.

The AF/MF alternating lever 49 has a first cam surface 49a and a second cam surface 49b on its outer circumference. During auto-focusing, the first cam surface 49a comes to the position at which it faces the contact member 34c of the lever member 34. When the AF/MF alternating lever 49 is moved in the direction indicated by the arrow E, the second cam surface 49b comes into contact with the contact member 34c of the lever member 34, whereupon the AF/MF alternating lever 49 moves the lever member 34 with the shaft 34a as the fulcrum, in the same manner shown in FIG. 11.

Consequently, the clutch gear 14 disengages from the reduction gears 18 (see FIG. 5) and the coupler push lever 23 retracts from the coupler 21, so that manual focusing may be performed in the same manner as in the first embodiment. When the AF/MF alternating lever 49 is moved in the direction opposite from the arrow E, the lever member 34 returns to the position shown in FIG. 5, so that auto-focusing may be performed.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A drive device that is located inside a main body and can drive a driven unit that is interchangeably mounted to the main body, said drive device comprising:

a coupler that transmits the drive force to the driven unit;

a drive motor that rotates and drives the coupler;

a clutch mechanism that connects and disconnects the coupler and the drive motor, and an encoder that detects the amount of rotation of the coupler while the coupler and the drive motor are disconnected by the clutch mechanism.

2. A drive device according to claim 1, wherein said encoder comprises a contact encoder that has a pulse generating pattern that rotates together with the coupler, as well as a contact that comes into contact with the pulse generating pattern and generates pulse signals.

3. A drive device according to claim 1, wherein said encoder comprises a non-contact encoder having a pulse generating pattern that rotates together with the coupler and a non-contact detector that detects the pulse generating pattern and generates pulse signals.

4. A drive device according to claim 1, wherein said encoder comprises a contact encoder having a first pulse generating pattern that rotates together with the coupler and a contact that comes into contact with the first pulse generating pattern and generates pulse signals and a non-contact encoder having a second pulse generating pattern that rotates together with the coupler and a non-contact detector that detects the second pulse generating pattern and generates pulse signals.

5. A drive device according to claim 4, said contact encoder detects the amount of rotation of the coupler when the main body has been in a standby state while waiting for the coupler to start rotating, and the non-contact encoder detects the amount of rotation of the coupler immediately after it is disconnected from the drive motor after it rotates by the drive motor.

6. A drive device according to claim 4, wherein said encoder detects the amount of rotation of the coupler by the non-contact encoder while the coupler and the drive motor are connected by the clutch mechanism.

7. A drive device according to claim 1, wherein said main body is a camera body and a driven unit is a lens unit.

8. A drive device according to claim 7, wherein said lens unit has a lens driven by the coupler and manual moving portion to move the lens and said encoder detects the amount of rotation of the coupler based on the movement of the lens while the coupler and the drive motor are disconnected by the clutch mechanism.

9. A drive device according to claim 7, further comprising:

a controller that detects a position of a lens in the lens unit.

10. A drive device according to claim 9, wherein said controller controls aperture value based on the position of the lens.

11. A drive device according to claim 9, wherein said controller controls light amount of a flash based on the position of the lens.

12. A camera comprising:

a lens unit that includes a lens and a moving member, wherein said lens is movable along the optical axis of the lens and the moving member is moved by a movement of the lens;

a motor that generates a driving force for drive the lens;

a clutch that connects and disconnects the lens unit and the motor; and an encoder that detects the amount of movement of the moving member while the lens unit and the motor are disconnected by the clutch.

13. A camera according to claim 12, wherein said lens unit is detachable from a main body of the camera.

14. A camera according to claim 12, further comprising:

operating member that manually moves the lens of the lens unit.

* * * * *